United States Patent
Brooks

(10) Patent No.: US 8,146,287 B2
(45) Date of Patent: Apr. 3, 2012

(54) INTEGRATED FISHING ROD HOLDER KIT

(76) Inventor: Paul T. Brooks, Boise, ID (US)

( * ) Notice: Subject to any disclaimer, the term of this patent is extended or adjusted under 35 U.S.C. 154(b) by 492 days.

(21) Appl. No.: 12/416,871

(22) Filed: Apr. 1, 2009

(65) Prior Publication Data

US 2010/0050495 A1 Mar. 4, 2010

Related U.S. Application Data

(60) Provisional application No. 61/094,122, filed on Sep. 4, 2008.

(51) Int. Cl.
*A01K 97/10* (2006.01)
(52) U.S. Cl. ............... 43/21.2; 248/532; 248/530
(58) Field of Classification Search ........... 43/21.2; 248/532, 530
See application file for complete search history.

(56) References Cited

U.S. PATENT DOCUMENTS

| | | | | |
|---|---|---|---|---|
| 1,092,548 A | * | 4/1914 | Weber | 43/21.2 |
| 1,271,073 A | | 7/1918 | Patten | |
| 2,241,183 A | | 5/1941 | Ceder | |
| 2,438,388 A | * | 3/1948 | Dolk | 248/532 |
| 2,839,865 A | * | 6/1958 | Lubanski | 43/26 |
| 3,858,833 A | * | 1/1975 | Fink | 248/533 |
| 3,924,345 A | * | 12/1975 | Sapp | 43/21.2 |
| 4,443,963 A | * | 4/1984 | Braaten | 43/21.2 |
| 4,479,628 A | * | 10/1984 | Albright | 248/530 |
| 4,642,931 A | * | 2/1987 | Flores | 43/21.2 |
| 4,748,762 A | * | 6/1988 | Campbell | 43/21.2 |
| 6,216,998 B1 | * | 4/2001 | Butrymowicz et al. | 248/530 |
| 6,318,017 B1 | * | 11/2001 | Genardo | 43/21.2 |
| 6,453,598 B1 | * | 9/2002 | Robertson | 43/21.2 |
| 7,210,264 B1 | * | 5/2007 | Demetris | 43/23 |

* cited by examiner

*Primary Examiner* — Christopher P Ellis
(74) *Attorney, Agent, or Firm* — Charles R. Clark

(57) ABSTRACT

An integrated fishing rod holder kit incorporates a grip coupler that replaces a butt cap on a preexisting fishing rod that has a hollow rod blank having a void space that extends linearly through from the butt of the rod through a rear grip end and forward through the grip area and reel seat area of the rod towards the fishing rod tip. The grip coupler is securely fixed to the rear grip end coaxially and preferably about the rod blank butt end that is revealed after the butt cap is removed. The grip coupler has external threads on its outer surface for engaging a coupler engagement collar of a rod holder body.

A rod holder body has an internally threaded collar coaxial to an elongate support rod shaft having one end mounted within the rod holder body and the free end of the shaft extending through and outward from the threaded collar, the rod holder body has a generally V-shaped holder end at the end opposite the collar, and the support rod shaft is elongate and sized to be removably received within the hollow rod blank of the fishing rod and selectively secured therein by engagement by the collar of the external threads of the grip coupler.

When removed from the hollow rod blank of a fishing rod, the rod holder body and attached elongate support rod shaft can be used as a rod holder to prop up the rest of the fishing rod.

7 Claims, 3 Drawing Sheets

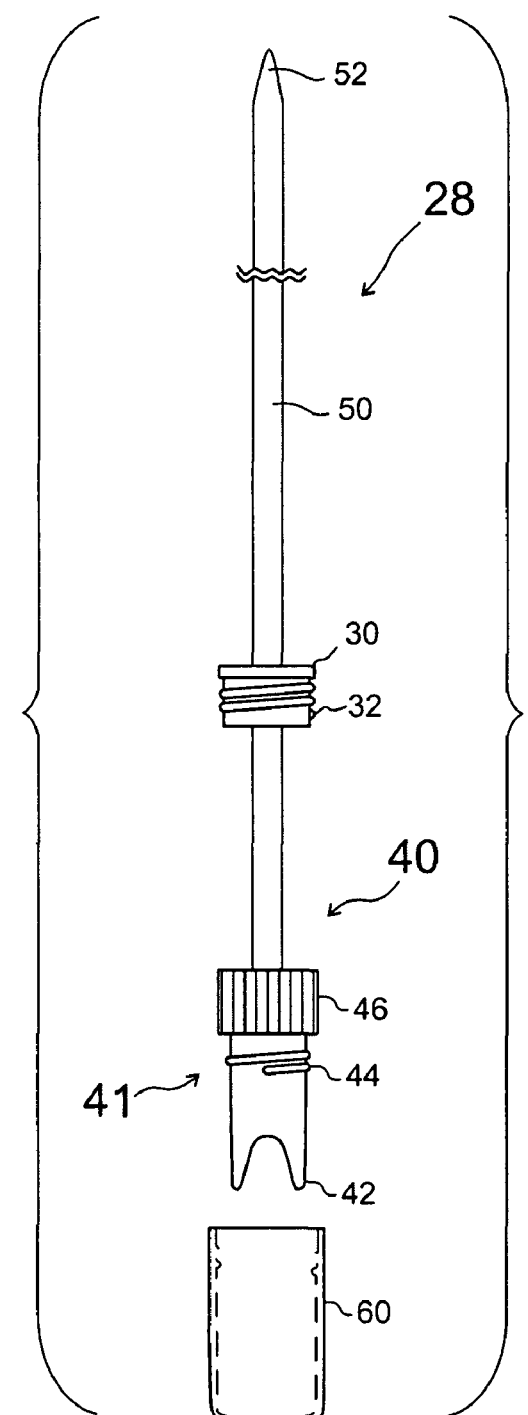
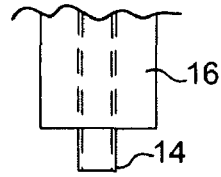
PRIOR ART
FIG. 1
PRIOR ART
FIG. 2
FIG. 3

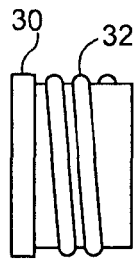
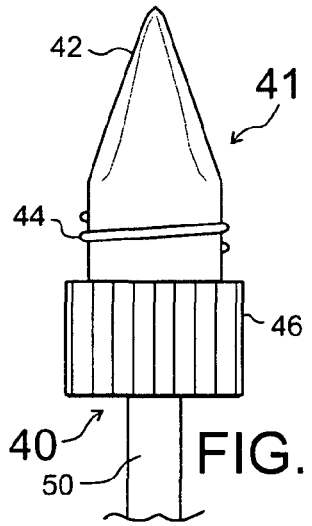
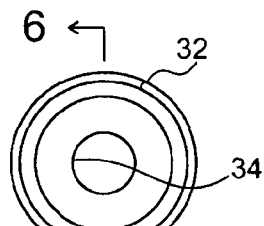
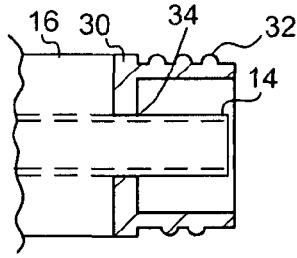
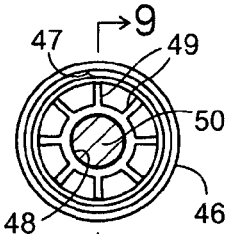
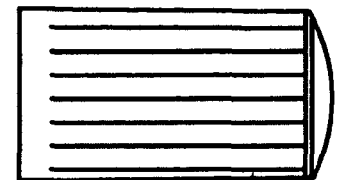
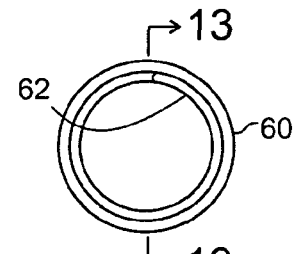
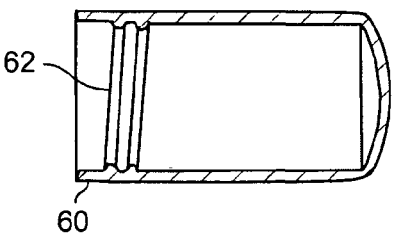
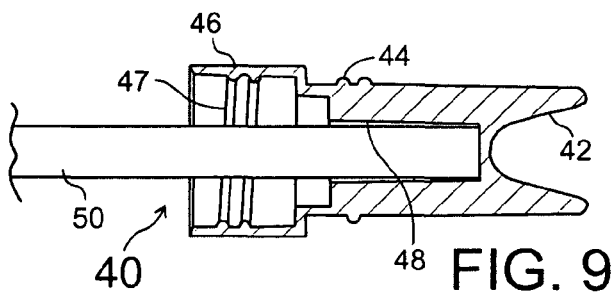
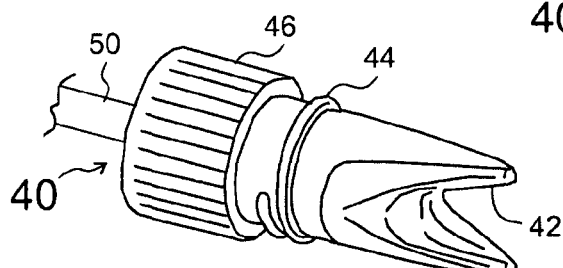

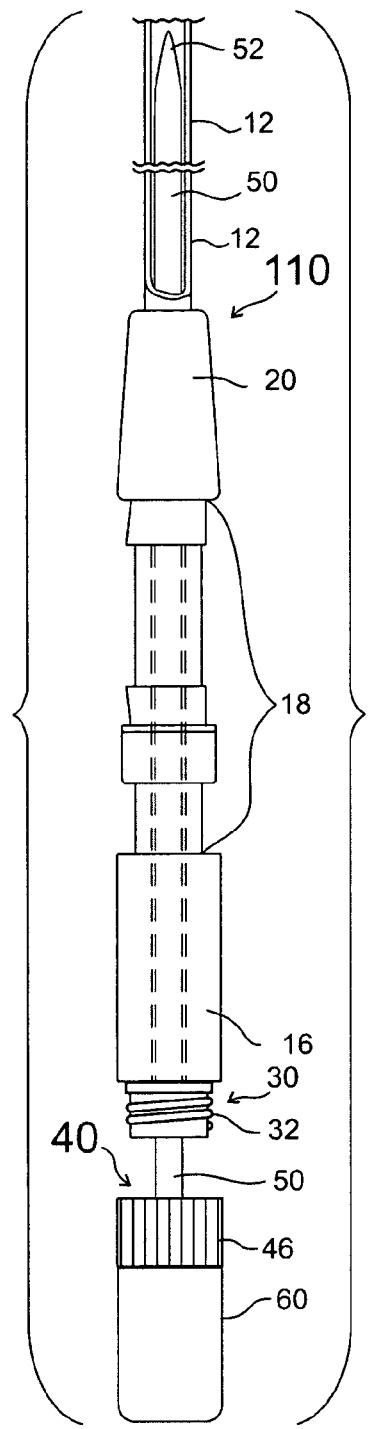
FIG. 14
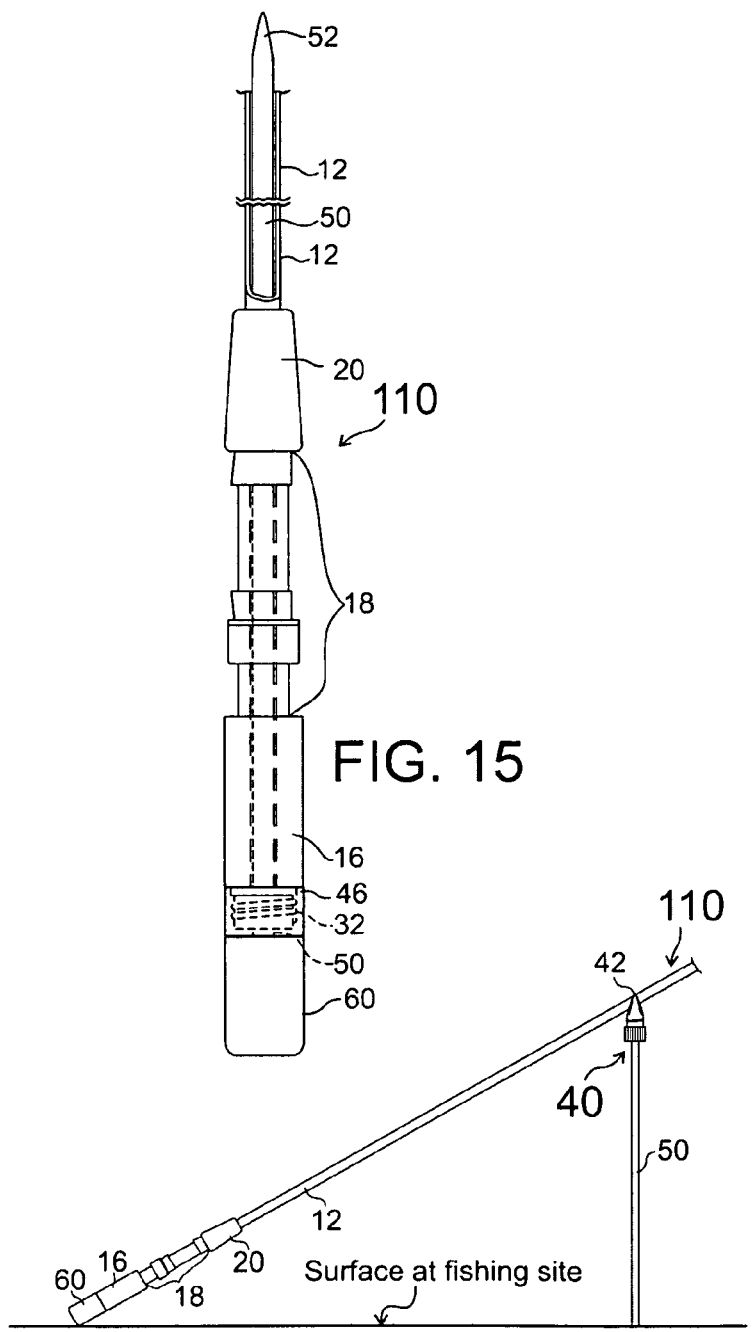
FIG. 15
FIG. 16

US 8,146,287 B2

INTEGRATED FISHING ROD HOLDER KIT

CROSS-REFERENCE TO RELATED APPLICATIONS

This application claims the benefit of U.S. Provisional Application No. 61/094,122, filed Sep. 4, 2008.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Many sport fishers fish from a stream bank or from a shore using a personal fishing rod equipped with a fishing line and a reel. After putting a fishing line into the stream or body of water from the bank or shore or at other times while fishing, a sport fisher may want to prop up his or her fishing rod with a rod holder so as not always personally having to hold the rod.

Sport fishers have been known to use rocks, stones, logs, branches or other natural features to function as a holder for the rod. Sport fishers have also been known to carry various types of holder apparatuses separate from their fishing rods with them in their fishing kit to use as rod holders.

An object of the present invention is to provide a fisherman having a fishing rod that has a rod blank that is hollow from above the grip area and through the grip area with a kit to modify the fishing rod and equip it with a compact, lightweight, and readily accessible rod holder storable and carriable within the hollow lower portion of the rod blank for selective use during a fishing event that is more convenient and easier to use than prior art rod holders.

BRIEF SUMMARY OF THE INVENTION

A principal objective of this invention is provide an integrated fishing rod holder kit or a fishing rod holder to help a person who wants to use a fishing rod holder to more easily carry the rod holder to a fishing environment within a fishing rod and selectively deploy the rod holder once the person is in the fishing environment.

A further object of the invention is making available to users a fishing rod holder that is durable, easy to use, easy to secure in position, is inexpensive to manufacture, and is easy to deploy and undeploy.

Additional and various other objects and advantages attained by the invention will become more apparent as the specification is read and the accompanying figures are reviewed.

BRIEF DESCRIPTION OF THE SEVERAL VIEWS OF THE DRAWINGS

FIG. 1 is a side view of a prior art fishing rod 10 having an elongate hollow rod blank 12 and showing a hollow rod blank butt end 14 of the hollow rod blank extending axially out from a rear grip end 16 and secured within a butt cap 22;

FIG. 2 is a partial side view of the rear grip end 16 of the fishing rod shown in FIG. 1 with the butt cap 22 removed showing and exposing the hollow rod blank butt end 14 extending axially out from the rear grip end;

FIG. 3 is an exploded view of an integrated fishing rod holder kit 28;

FIG. 4 is a side view of a grip coupler 30 of the rod holder kit 28 shown in FIG. 3;

FIG. 5 is a rear axial view of the grip coupler 30 shown in FIG. 4 showing an interior coupler axial bore 34;

FIG. 6 is a partial cross-sectional view of the grip coupler 30 shown in FIG. 5 showing the grip coupler fixed to the rear grip end 16;

FIG. 7 is a partial side view of a rod holder 40 having a rod holder body 41 and an attached elongate support rod shaft 50 shown in FIG. 3;

FIG. 8 is a partial axial view of the rod holder 40, shown in FIG. 7, having a support rod shaft receiving cavity 48, and showing the support rod shaft 50 fixed in the shaft receiving cavity and showing a plurality of supporting ribs 49;

FIG. 9 is a partial cross-sectional view of the rod holder 40 showing the support rod shaft 50 received in the support rod shaft receiving cavity 48 shown in FIG. 8;

FIG. 10 is a partial perspective view of the rod holder 40 shown in FIG. 8;

FIG. 11 is a side view of a shroud cap 60 shown in FIG. 3;

FIG. 12 is rear axial view of the shroud cap 60 shown in FIG. 3 showing the interior of the shroud cap;

FIG. 13 is a cross-sectional view of the shroud cap 60 shown in FIG. 12 showing an internal threaded shroud portion 62;

FIG. 14 is a partial cutaway side view of an improved fishing rod 110 modified by replacing the butt cap (not shown) with the grip coupler 30 fixed axially to the rear grip end 16, showing the rod holder 40 partially drawn out axially from within the grip coupler and from within the hollow rod blank 12;

FIG. 15 is a partial cutaway side view of the fishing rod 110 shown in FIG. 14 showing a coupler engagement collar 46 of the rod holder body 41 selectively and reversibly secured to an external threaded coupler portion 32 of the grip coupler 30 and showing the support rod shaft 50 stored through the grip coupler and within the hollow rod blank 12; and FIG. 16 is a partial side view of the fishing rod 110 shown in FIGS. 14 and 15 showing the rod holder 40 deployed from within the fishing rod, showing the rod shaft 50 partially and generally inserted vertically into the surface at the fishing site, showing the shroud cap 60 removed from the rod holder body 41 and selectively attached to the grip coupler by engaging the external threaded coupler portion (not shown), and showing a portion of the rod blank 12 forward of a fore grip 20 of the fishing rod resting within an upstanding open and generally V-shaped holder end 42 of the rod holder body.

DETAILED DESCRIPTION OF THE INVENTION

FIG. 1 shows a prior art fishing rod 10 having a rear grip end 16 and having an elongate and generally tubular hollow rod blank 12 having a rod blank butt end 14 extending axially out from the rear grip end and the butt end secured within a butt cap 22 and the rod blank extending forward and axially through the rear grip end, a reel seat portion 18, and a fore grip 20 and extending beyond the fore grip towards a fishing rod tip 24.

In the best embodiment of the invention, the butt cap 22 of a preexisting fishing rod 10 is removed and replaced by a generally annular grip coupler 30 of an integrated fishing rod holder kit 28 enabling the incorporation of a rod holder 40 into the fishing rod to create an improved fishing rod 110.

The integrated fishing rod holder kit 28 combined with a preexisting fishing rod having a rear grip end 16 and having an elongate hollow rod blank 12 there through and the rod blank extending forward towards a fishing rod tip 24 comprises a grip coupler 30 having an external threaded coupler portion 32 and an interior coupler axial bore 34 preferably sized to surround and receive the rod blank butt end 14 there through, the grip coupler fixed axially to the rear grip end 16 with the coupler axial bore coaxial to and encircling an open hollow rod blank butt end 14 of the elongate hollow rod blank 12 of the fishing rod; an integrated fishing rod holder 40 having a rod holder body 41 having an open generally V-shaped holder end 42 connected to an intermediate threaded shroud cap engagement portion 44 connected coaxially to a coupler engagement collar 46, and the coupler engagement collar having an internal threaded collar portion 47 sized to cooperate with the external threaded coupler portion of the grip coupler, and the fishing rod holder body having an internal support rod shaft receiving cavity 48 preferably coaxial to the coupler engagement collar receiving and retaining a first end of a support rod shaft 50 inserted within the cavity, the support rod shaft having a free end 52 preferably pointed, the support rod shaft sized to be easily received coaxially within the hollow rod blank; and a shroud cap 60 having an internal threaded shroud portion 62 sized to cooperate with the intermediate threaded shroud cap engagement portion of the rod holder body and the shroud cap sized to selectively engage either the rod holder body by engaging the shroud cap engagement portion or the threaded coupler portion of the grip coupler.

Preferably, the external threaded coupler portion 32 is sized the same as the intermediate threaded shroud cap engagement portion 44 of the rod holder body 41 to allow the user to selectively engage the grip coupler or the holder body with the internal threaded shroud portion 62 of the shroud cap. Preferably, during use, the shroud cap 60 coaxially and selectively covers either the V-shaped holder end 42 when the rod holder 40 is undeployed (storage condition) or the grip coupler 30 when the rod holder is deployed to hold the fishing rod in a propped up condition.

FIGS. 3 to 16 show an integrated fishing rod holder kit 28 and its components. Preferably, an epoxy glue is used to fix the grip coupler 30 to the rear grip end 16 and is also used to retain the first end of the support rod shaft 50 within the support rod shaft receiving cavity 48.

FIG. 3 shows in an exploded view the elements of the rod holder kit 28 that replace the butt cap 22 of the prior art fishing rod and provides a rod holder 40 having a rod holder body 41 attached to an elongate support rod shaft 50. The rod holder kit 28 comprises a grip coupler 30 having an external threaded coupler portion 32 and having a coupler axial bore 34 (shown in FIG. 5) sized to receive and retain a rod blank butt end 14 of a hollow rod blank 12 that extends outward from a rear grip end 16 of a fishing rod; the grip coupler is fixed to the rear grip end; the grip coupler cooperates with an integrated fishing rod holder 40 having a rod holder body 41 having an open generally V-shaped holder end 42 to receive and to cooperate with a portion of the fishing rod blank to prop up the fishing rod 110 when the rod holder is deployed as shown in FIG. 16, an intermediate threaded shroud cap engagement portion 44 next adjacent to the holder end, a coupler engagement collar 46 having an internal threaded collar portion 47, the engagement collar sized to cooperate and selectively engage the external threaded coupler portion when the rod holder is undeployed, the engagement collar next adjacent to the engagement portion, an elongate support rod shaft 50 attached axially to the holder body through the coupler engagement collar, the support rod shaft sized to be freely and slidingly received within the hollow rod blank 12 for storage and transportation to and from a fishing site or fishing event, the rod shaft having a free end 52 that is preferably pointed that eases insertion of the rod shaft for storage within the fishing rod and eases insertion of the rod shaft into the ground at a fishing site, and a shroud cap 60 sized to removably fit and cooperate with the threaded coupler portion to cover the end of the grip coupler when the rod holder is removed from the storage position to a deployed position and the shroud cap 60 is preferably sized to cooperate and selectively cover the V-shaped holder end 42 when the support rod shaft 50 is in the storage position within the fishing rod 110.

Referring to FIGS. 1 through 16, a fisherman or other user can modify an existing fishing rod 10 that has a hollow rod blank 12 throughout a grip area and extending to or outwardly below the grip area and capped by a butt cap 22 and the rod blank extending forward towards the fishing rod tip with the present invention to allow a fisherman or other user to conveniently carry for ready use a rod holder 40 within a fishing rod.

A method of modification of a preexisting fishing rod 10 requires: removing a butt cap 22 from the rear grip end 16, attaching an appropriately sized grip coupler 30 to the rear grip end coaxially to the hollow rod blank 12, and reversibly inserting and attaching a rod holder 40 through and to the grip coupler 30.

Alternatively, a fishing rod could be manufactured initially to incorporate the present invention to allow a fisherman or other user to conveniently carry for ready use a rod holder 40 within a fishing rod. The grip coupler could be integrated into the manufacture of the rear grip end of a fishing rod to allow the rod holder 40 to interact with a newly manufactured fishing rod.

Preferably, the rod holder body 41 and the shroud cap 60 are made of LDPE or another suitable moldable plastic material by injection molding or other suitable process. Preferably, the grip coupler 32 is made of ABS plastic or another suitable moldable plastic or another suitable material such as metal, ceramic material, wood, or other durable material by injection molding or other suitable process.

Preferably, the elongate support rod shaft 48 is made of fiberglass rod or tubing and is a preferable length of about 28 inches and diameter of about 5/16 of an inch or a length in the range between 6 and 36 inches and a diameter in a range between an eighth of an inch and 3/4 of an inch. The support rod shaft 50 could alternatively be made of steel or aluminum or a metallic alloy rod or tube or wire or some other suitable plastic or laminate material.

Preferably, the grip coupler 32 is secured to the rear grip end 16 and to the rod blank butt end 14 and an end of the rod shaft 50 is secured in the receiving cavity 48 using a suitable adhesive such as an epoxy glue or 3M Scotch-Weld® glue or another suitable method of joining known in the art of fishing rod construction.

An epoxy glue marketed under the trademark DOUBLE/BUBBLE® EPOXY EXTRA FAST SETTING available from Royal Adhesives & Sealants, LLC of Belleville, N.J. has been found to be suitable adhesive for use in the present invention.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they fairly, legitimately and equitably are entitled.

I claim:

1. An integrated fishing rod holder kit comprising a grip coupler sized to cooperate with an integrated fishing rod holder, said grip coupler having an external threaded coupler portion and having an interior coupler axial bore, said rod holder having a rod holder body having a V-shaped holder end connected to an intermediate threaded shroud cap engagement portion connected coaxially to a coupler engagement collar, said collar having an internal threaded coupler portion sized to cooperate with said external threaded coupler portion, said rod holder body having an internal support rod shaft receiving cavity receiving and retaining a first end of an elongate support rod shaft inserted within said cavity, said support rod shaft having a free end.

2. An integrated fishing rod holder kit comprising
    a grip coupler having an external threaded coupler portion and having an interior coupler axial bore, said grip coupler fixed axially to a rear grip end of a fishing rod, with said coupler axial bore coaxial to and encircling
    an open hollow rod blank butt end of an elongate hollow rod blank of said fishing rod, said rod blank extending from said butt end forward through said rear grip end and extending beyond towards a fishing rod tip of said fishing rod,
    a rod holder having a rod holder body having a V-shaped holder end connected to an intermediate threaded shroud cap engagement portion connected coaxially to a coupler engagement collar, said collar having an internal threaded coupler portion sized to cooperate with said external threaded coupler portion, said rod holder body having an internal support rod shaft receiving cavity receiving and retaining a first end of an elongate support rod shaft inserted within said cavity, said support rod shaft having a free end, and said support rod shaft sized to be received coaxially within said hollow rod blank.

3. An integrated fishing rod holder kit according to claim 2 wherein said grip coupler is generally annular.

4. An integrated fishing rod holder kit according to claim 2 wherein said free end is pointed.

5. An integrated fishing rod holder kit according to claim 2 further comprising
    a shroud cap having an internal threaded shroud portion sized to cooperate with said intermediate threaded shroud cap engagement portion and said shroud cap sized to selectively engage either said rod holder body by engaging said shroud cap engagement portion or said external threaded coupler portion.

6. An integrated fishing rod holder kit according to claim 2 wherein an epoxy glue is used to fix said grip coupler to said rear grip end and is used to retain said first end within said support rod shaft receiving cavity.

7. A method of modification of a preexisting fishing rod having a hollow rod blank throughout a rear grip end and extending to or outwardly below said rear Grip end and capped by a butt cap and said rod blank extending forward towards a fishing rod tip comprising
    a) removing said butt cap:
    b) attaching a grip coupler to said rear grip end and coaxial to said rod blank, said grip coupler having an external threaded coupler portion and having an interior coupler axial bore: and
    c) reversibly inserting and attaching a rod holder through and to said grip Coupler, said rod holder having a rod holder body having a V-shaped holder end connected to an intermediate threaded shroud cap engagement portion connected coaxially to a coupler engagement collar, said collar having an internal threaded coupler portion sized to cooperate with said external threaded coupler portion, said rod holder body having an internal support rod shaft receiving cavity receiving and retaining a first end of an elongate support rod shaft inserted within said cavity, said support rod shaft having a free end, and said support rod shaft sized to be received coaxially within said hollow rod blank.

* * * * *